United States Patent
Zuo et al.

(10) Patent No.: US 9,411,183 B2
(45) Date of Patent: Aug. 9, 2016

(54) LIQUID CRYSTAL DISPLAY DEVICE AND METHOD FOR MANUFACTURING THE SAME

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Xiongcan Zuo, Beijing (CN); Junhwan Lim, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 728 days.

(21) Appl. No.: 13/704,789

(22) PCT Filed: Oct. 29, 2012

(86) PCT No.: PCT/CN2012/083703
§ 371 (c)(1),
(2) Date: Dec. 17, 2012

(87) PCT Pub. No.: WO2013/071815
PCT Pub. Date: May 23, 2013

(65) Prior Publication Data
US 2014/0176883 A1    Jun. 26, 2014

(30) Foreign Application Priority Data
Nov. 14, 2011 (CN) .......................... 2011 1 0360131

(51) Int. Cl.
*G02F 1/1333* (2006.01)

(52) U.S. Cl.
CPC .. *G02F 1/1333* (2013.01); *G02F 2001/133302* (2013.01)

(58) Field of Classification Search
None
See application file for complete search history.

(56) References Cited

U.S. PATENT DOCUMENTS 4,236,946 A * 12/1980 Aboaf .................... C23C 14/14
148/108
5,378,548 A * 1/1995 Torii ....................... G11B 5/667
428/832.1

(Continued)

FOREIGN PATENT DOCUMENTS

CN        1388838    *  1/2003  ............ H01F 41/205
CN    101676775 A       3/2010

(Continued)

OTHER PUBLICATIONS

Takashi Nakanishi; "Polymorphism Based on Supramolecular Fullerenes—Freedom in the Creation of Nanotech Parts with Desired Shapes", National Institute for Materials Science, vol. 4, Sep. 9, 2006; 6 pages.

(Continued)

*Primary Examiner* — Edward Glick
*Assistant Examiner* — Anthony G Quash
(74) *Attorney, Agent, or Firm* — Ladas & Parry LLP

(57) ABSTRACT

Embodiments of the invention disclose a liquid crystal display device and a method for manufacturing the same. The liquid crystal display device comprises: a color filter substrate including a first transparent substrate; and an array substrate including a second transparent substrate, wherein the first transparent substrate has a first transparent magnetic film layer formed thereon, the second transparent substrate has a second transparent magnetic film layer formed thereon, and the first transparent magnetic film layer and the second transparent magnetic film layer have the same magnetism.

16 Claims, 1 Drawing Sheet

(56) References Cited

U.S. PATENT DOCUMENTS

| | | | |
|---|---|---|---|
| 6,476,882 B1 * | 11/2002 | Sakurai | G02F 1/136259 349/54 |
| 7,728,936 B2 * | 6/2010 | Chao | G02F 1/1337 349/123 |
| 2008/0204645 A1 * | 8/2008 | Kawabe | G02F 1/13394 349/123 |
| 2009/0079929 A1 * | 3/2009 | Chao | G02F 1/1337 349/191 |
| 2011/0043714 A1 | 2/2011 | Chang | |

FOREIGN PATENT DOCUMENTS

| | | | |
|---|---|---|---|
| CN | 101995693 A | 3/2011 | |
| CN | 102654671 A | 9/2012 | |
| JP | 60-118824 | * 6/1985 | G02F 1/133 |
| JP | 60-118824 A | 6/1985 | |
| JP | 11-202350 A | 7/1999 | |
| KR | 20030023103 A | 3/2003 | |

OTHER PUBLICATIONS

Yuji Matsumoto, et al; "Room-Temperature Ferromagnetism in Transparent Transition Metal-Doped Titanium Dioxide", Science, vol. 291, Feb. 2, 2001, pp. 854-856.

International Search Report mailed Jan. 24, 2013; PCT/CN2012/083703.

First Chinese Office Action dated. Mar. 5, 2014; Appln. No. 201110360131.7.

International Preliminary Report on Patentability dated May 20, 2014; PCT/CN2012/083703.

* cited by examiner

LIQUID CRYSTAL DISPLAY DEVICE AND METHOD FOR MANUFACTURING THE SAME

TECHNICAL FIELD

Embodiments of the invention relate to a liquid crystal display device and a method for manufacturing the same.

BACKGROUND

In the conventional thin film transistor liquid crystal display device (TFT-LCD), a color filter (CF) substrate and an array substrate are supported in general by spacers (e.g., ball spacers (BS) or photo spacers (PS)) to form a space for containing liquid crystals between the color filter substrate and the array substrate. As shown in FIG. 1, which is a structural schematic view of a conventional liquid crystal display device, the liquid crystal display device includes a color filter substrate and an array substrate which are bonded to each other. The color filter substrate comprises a transparent substrate 1, a black matrix (BM) 2 and color filters 3 formed on the transparent substrate 1, a common electrode 4 formed on the black matrix 2 and the color filters 3, and an alignment film 5 formed on the common electrode 4. The array substrate comprises a transparent substrate 1', gates 17 formed on the transparent substrate 1', a gate insulator layer 11 formed on the gates 17, an active layer 9, source/drain (S/D) layers 8, and a pixel electrode layer 10 formed on the gate insulator layer 11, an insulating layer (a PVX layer) 7 formed on the source/drain layers 8 and the pixel electrode layer 10, and an alignment film 5' formed on the insulating layer 7. Spacers 14 are disposed between the alignment film 5 of the color filter substrate and the alignment film 5' of the array substrate to keep the thickness of cells, so as to form a space for containing liquid crystals 12 between the color filter substrate and the array substrate.

Y. Matsumoto, etc., reported in 2001 that a diluted magnetic semiconductor formed by implanting a small amount of Co into a wide band-gap semiconductor of $TiO_2$ exhibits a room temperature ferromagnetism; and $Co_xTi_{1-x}O_2$ is also named as a transparent ferromagnet since $TiO_2$ itself has several excellent physical and chemical properties such as a high refraction index, an excellent transmittance in a range of visible light and infrared light, and so on. National Institute for Materials Science in Japan (NIMS) has also developed a new type of film-like transparent magnetic semiconductor, which is $Ti_{0.8}Co_{0.2}O_2$ and $Ti_{0.6}Fe_{0.4}O_2$ formed by adding magnetic elements of Co and Fe into $Ti_{1-\delta}O_2$ (i.e., a photocatalyst material of $TiO_2$ in form of a film), may have a thickness down to about 1 nm, and is the thinnest transparent magnetic material among the materials developed so far. The prior arts have successfully prepared at a low temperature a diluted magnetic semiconductor film of $Zn_{1-x}Co_xO$, which exhibits room temperature ferromagnetism, using a method of plasma enhanced chemical vapor deposition (PECVD), and studied systematically the structure, the surface topography, the optical property and the magnetic property of the film.

SUMMARY

An embodiment of the invention provides a liquid crystal display device, which comprises: a color filter substrate including a first transparent substrate; and an array substrate including a second transparent substrate, wherein the first transparent substrate has a first transparent magnetic film layer formed thereon, the second transparent substrate has a second transparent magnetic film layer formed thereon, and the first transparent magnetic film layer and the second transparent magnetic film layer have the same magnetism.

Another embodiment of the invention provides a method for manufacturing a liquid crystal display device, which comprises: forming a color filter substrate including a first transparent substrate, the first transparent substrate having a first transparent magnetic film layer formed thereon; forming an array substrate including a second transparent substrate, the second transparent substrate having a second transparent magnetic film layer formed thereon, and the second transparent magnetic film layer and the first transparent magnetic film layer having the same magnetism; and bonding the color filter substrate to the array substrate to form a space between the color filter substrate and the array substrate, and injecting liquid crystals into the space.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a liquid crystal display device, which can keep a certain cell gap without spacers, and form a space for containing liquid crystals between a color filter substrate and an array substrate. An embodiment of the invention also provides a method for manufacturing the aforementioned liquid crystal display device.

A liquid crystal display device according to an embodiment of the invention will be described in detail hereinafter with reference to FIG. 2.

Figure 1:
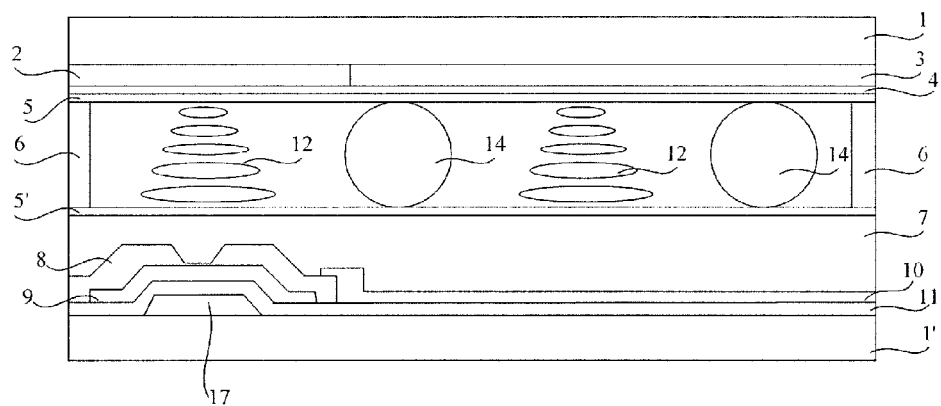
FIG. 1 is a schematic view showing a structure of the conventional liquid crystal display device.
Figure 2:
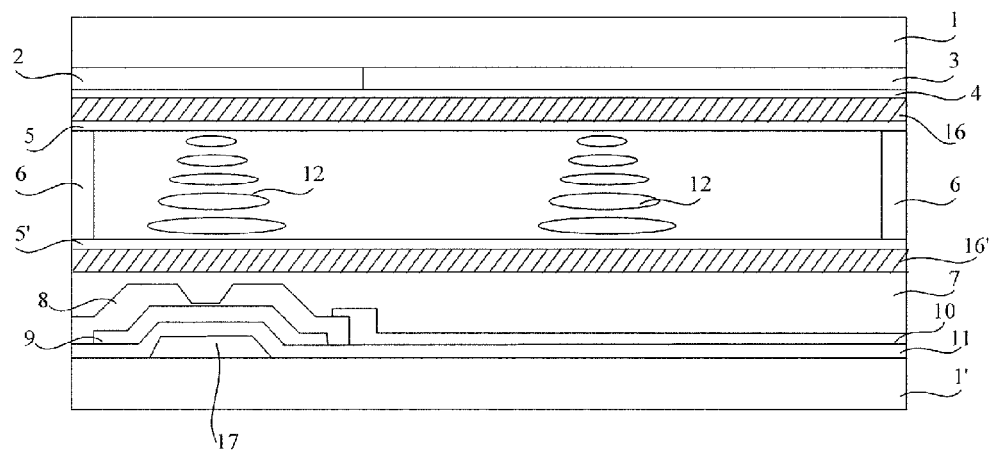
FIG. 2 is a schematic view showing a structure of a liquid crystal display device according to an embodiment of the invention.

FIG. 2 is a schematic view showing a structure of a liquid crystal display device according to an embodiment of the invention. As shown in FIG. 2, the liquid crystal display device according to the embodiment of the invention may include a color filter substrate and an array substrate which are bonded to each other.

The color filter substrate may include a transparent substrate 1 (e.g., a glass substrate), a black matrix 2 and color filters 3 formed on the transparent substrate 1, a common electrode 4 formed on the black matrix 2 and the color filters 3, a transparent magnetic film layer 16 formed on the common electrode 4, and an alignment film 5 (which is an outermost layer of the color filter substrate) formed on the transparent magnetic film layer 16. In embodiments of the invention, the transparent magnetic film layer 16 may be formed between the transparent substrate 1 and the black matrix 2, between the black matrix 2 and the color filters 3, or between the color filter 3 and the common electrode 4 other than on the common electrode 4.

The array substrate may include a transparent substrate 1', gates 17 formed on the transparent substrate 1', a gate insulator layer 11 formed on the gates 17, an active layer 9, source/drain layers 8, and a pixel electrode layer 10 formed on the gate insulator layer 11, an insulating layer 7 formed on the source/drain layers 8 and the pixel electrode layer 10, a transparent magnetic film layer 16' formed on the insulating layer 7, and an alignment film 5 (which is the outermost layer of the array substrate) formed on the transparent magnetic film layer 16'. In embodiments of the invention, other than on the insulating layer 7, the transparent magnetic film layer 16' may be formed between the transparent substrate 1' and the gates 17, between the gates 17 and the gate insulator layer 11, between the gate insulator layer 11 and the active layer 9, between the source/drain layers 8 and the pixel electrode layer 10, or between the source/drain layers 8 and the pixel electrode layer 10 and the insulating layer 7.

The transparent magnetic film layer 16 on the color filter substrate and the transparent magnetic film layer 16' on the array substrate have the same magnetism, and thereby a space is formed between the color filter substrate and the array substrate via uniform and weak magnetic fields of the same poles repulsing each other, which is used to maintain the cell gap and contain liquid crystals 12. In this example, the transparent magnetic film layer 16 is described exemplarily as being formed on the common electrode 4, and the transparent magnetic film layer 16' is described exemplarily as being formed on the insulating layer 7; however, the locations of the transparent magnetic film layers 16 and 16' are not limited thereto as stated above.

The transparent magnetic film layers in the present embodiment are of a diluted magnetic semiconductor film, which is formed from a dopant and a substance to be doped through a chemical reaction deposition. The dopant may be one or more of acetylacetonates comprising magnetic transition group metal element(s), and the magnetic transition group metal element(s) includes one or more of Fe, Co, Ni, and Mn; and the substance to be doped may be one or more of acetylacetonates comprising nonmagnetic transition group metal element(s), and the nonmagnetic transition group metal element(s) includes one or more of Zn, Zr, Ti, and Ga. The molecular formula of the acetylacetonate may be (CxHyOz)X, in which X=Fe, Co, Ni, Mn, Zn, Zr, Ti, or Ga. The example of the acetylacetonate may be zinc acetylacetonate ($C_{10}H_{14}O_4Zn$) or manganese acetylacetonate ($C_{15}H_{21}O_6Mn$).

The strength of the magnetic fields between the transparent magnetic film layers 16 and 16' can be varied by changing the thicknesses of the transparent magnetic film layers and the kinds, proportioning, and concentrations of the magnetic transition group metal elements contained in the transparent magnetic film layers, so that different cell gaps can be realized.

Hereinafter, a method for manufacturing a liquid crystal display device according to an embodiment of the invention will be described in detail. The method for manufacturing the liquid crystal display device according to the embodiment of the invention includes for example the following steps:

Step S1 of forming a color filter substrate that includes a first transparent magnetic film layer;

In the embodiments of the invention, a black matrix 2 and color filters 3 are formed on a transparent substrate 1 (e.g., a glass substrate), a common electrode 4 is formed on the black matrix 2 and the color filters 3, a transparent magnetic film layer 16 is formed on the common electrode 4, and an alignment film 5 is formed on the transparent magnetic film layer 16. Thereby, the color filter is completed.

Though the transparent magnetic film layer 16 in the embodiment is formed on the common electrode 4, the transparent magnetic film layer 16 in other embodiments of the invention may be formed between the transparent substrate 1 and the black matrix 2, between the black matrix 2 and the color filters 3, or between the color filters 3 and the common electrode 4.

Step S2 of forming an array substrate that includes a second transparent magnetic film layer, which has the same magnetism as that of the first transparent magnetic film layer;

In the embodiments of the invention, gates 17 are formed on a transparent substrate 1' (e.g., a glass substrate), a gate insulator layer 11 is formed on the gates 17, an active layer 9, source/drain layers 8, and a pixel electrode layer 10 are formed on the gate insulator layer 11, an insulating layer 7 is formed on the source/drain layers 8 and the pixel electrode layer 10, a transparent magnetic film layer 16' having the same magnetism as that of the transparent magnetic film layer 16 is formed on the insulating layer 7, and an alignment film 5' is formed on the transparent magnetic film layer 16'. Thereby, the array substrate is completed.

Though the transparent magnetic film layer 16' in this embodiment is formed on the insulating layer 7, the transparent magnetic film layers 16' in other embodiments of the invention may be formed between the transparent substrate 1' and the gates 17, between the gate 17 and the gate insulator layer 11, between the gate insulator layer 11 and the active layer 9, between the pixel electrode layer 10 and the source/drain layers 8, or between the source/drain layers 8 and the pixel electrode layer 10 and the insulating layer 7.

Step S3 of performing an alignment process on the alignment films;

In the embodiments of the invention, the alignment process, such as a rubbing process or a photo-alignment process, is performed on the alignment films 5 and 5' on the outermost layer of the color filter substrate and the outermost layer of the array substrate.

Step S4 of injecting liquid crystals into a space between the array substrate and the color filer substrate;

In the embodiments of the invention, since the transparent magnetic film layers 16 and 16' have the same magnetism and thus repulse each other due to the same poles, a certain space exists between the array substrate and the color filter substrate. The liquid crystals are injected into the space between the array substrate and the color filter substrate.

Step S5 of sealing the color filter substrate and the array substrate;

In the embodiments of the invention, the color filter substrate and the array substrate are sealed using a photosensitive adhesive 6 to form the liquid crystal display device.

By means of the above processes, a liquid crystal display device is manufactured which requires no spacer.

Hereinafter, a method of forming the transparent magnetic film layer 16, 16' according to an embodiment of the invention will be described in detail. In the embodiment of the invention, the transparent magnetic film layers 16, 16' are formed using, for example, a process of plasma enhanced chemical vapor deposition (PECVD). The method of forming the transparent magnetic film layers 16, 16' according to the embodiment of the invention includes for example the following steps:

Step S11 of preparing an evaporation target;

In the embodiments of the invention, a dopant comprising a magnetic transition group metal element and a substance to be doped comprising a nonmagnetic transition group metal element are mixed in a certain atom ratio to obtain a mixed raw material; the mixed raw material is grinded to be mixed uniformly; and then the mixed raw material after the grinding is pressed at a predetermined high pressure into an evaporation target with a certain diameter.

In the embodiments of the invention, the dopant may be one or more of acetylacetonates comprising a magnetic transition group metal element, and the substance to be doped may be one or more of acetylacetonates comprising a nonmagnetic transition group metal element, in which the magnetic transition group metal element may include one or more of Fe, Co, Ni, and Mn, and the nonmagnetic transition group metal element may include one or more of Zn, Zr, Ti, and Ga.

In the embodiments of the invention, for example, if the dopant comprising a magnetic transition group metal element of Co and the substance to be doped comprising a nonmagnetic transition group metal element of Ti are mixed into the mixed raw material so that the atom percentage of the magnetic transition group metal element of Co is of 6% and the atom percentage of the nonmagnetic transition group metal element of Ti is of 94%, the transparent magnetic film layer prepared thereby has for example following advantages: having a better polycrystal characteristic without a formation of impurity phases; having a better room temperature ferromagnetism; and being colorless and having a better transmittance in a range of visible light.

Step S12 of disposing the evaporation target in a deposition chamber;

In the embodiments of the invention, the evaporation target is disposed in a clean container such as a quartz vessel, the quartz vessel containing the evaporation target is then disposed in a deposition chamber for PECVD, and the deposition chamber for PECVD is vacuumized with a molecular pump and a mechanical pump.

Step S13 of generating plasma in the deposition chamber for PECVD after disposing the color filter substrate and the array substrate in the deposition chamber for PECVD;

In the embodiments of the invention, the color filter substrate and the array substrate are fed into the deposition chamber for PECVD by a manipulator, the insulating layer and the common electrode serve as substrates and face directly just above the evaporation target, and then a reaction gas of $O_2$ is fed into the deposition chamber at a predetermined flow rate; the reaction gas of $O_2$ in the deposition chamber is ignited under a predetermined RF power by controlling a gate valve of the molecular pump to modulate the operating gas pressure in the deposition chamber and tuning a capacitance matching unit; and after the igniting, the deposition chamber is filled with a large amount of plasma, which includes oxygen (O) plasma and electrons moving at a high velocity.

Step S14 of performing the deposition process after heating the evaporation target;

In the embodiments of the invention, the quartz vessel containing the evaporation target is heated by a heater by operating a heating source, and the mixed raw material in the evaporation target will escape from the surface of the target successively under the heat radiation upon the evaporation target is heated to a certain extent, while the molecules of $O_2$ decompose in the case in which the plasma is bumped continuously by the electrons moving at the high velocity; transparent films of the mixed raw material are deposited on the surfaces of the insulating layer and the common electrode through chemical reaction, and the atom ratio of the mixed raw material on the surfaces of the insulating layer and the common electrode will be close to the atom ratio in the evaporation target.

Step S15 of unloading the substrates after cooling;

In the embodiments of the invention, after the proportion, the thickness, the uniformity, and so on of the mixed raw material in the transparent films deposited on the surfaces of the substrates meet the requirements, the heating is stopped and the substrates then cool down spontaneously; and the other operating parameters are kept unchanged throughout during the cooling, and the substrates having the transparent films deposited thereon are drawn out with the manipulator after the temperature lowers to a predetermined value.

Step S16 of performing a magnetization process on the transparent films;

In the embodiments of the invention, the magnetization process is performed on the transparent films on the surfaces of the substrates by locating the substrates in a chamber in which an external magnetic field is applied. The transparent films exhibit weak ferromagnetism that is uniform at room temperature through the magnetization process in this step, so that the transparent magnetic film layers are completed.

The type and the proportion of the mixed raw material, the diameter of the evaporation target, the operating gas pressure, the RF power, the time and the temperature for the heating, the time and the temperature for the deposition, the reaction rate, the time and the temperature for the cooling, and other process conditions referred to in step S11 through step S16 of the embodiment are determined synthetically according to the desired intensity of magnetism of the prepared transparent magnetic film layer. In order to manufacture liquid crystal display devices having different cell gaps, it is needed to form transparent magnetic film layers having different magnetism intensities, which are determined by the aforementioned process conditions together. There have been methods for manufacturing transparent magnetic films having different magnetism intensities in the prior art, and the PECVD method is also well known in the art, which will not be described in detail herein.

The method of forming the transparent magnetic film layer is described in the embodiment using a PECVD process as an example, but other embodiments of the invention may also adopt other processes to form the transparent magnetic film layer.

It can be seen from the above embodiments that embodiments of the invention form transparent magnetic film layers on the color filter substrate and the array substrate by mixing a dopant comprising a magnetic transition group metal element and a substance to be doped comprising a nonmagnetic transition group metal element in a predetermined atom ratio to form mixed raw material, so that a space is formed between the color filter substrate and the array substrate by means of the repulsion forces of the transparent magnetic film layers and a uniform cell gap of a liquid crystal display device can be maintained without spacers that are formed separately.

The forgoing embodiments are merely used to explain the technical solutions of the invention, but not limitations on them. Although the invention is described in detail with reference to the above embodiments, as would be appreciated by those ordinarily skilled in the art, they can make modifications to the technical solutions recorded by the above embodiments or make equivalent replacements to a part of technical features therein; and these modifications or replacements do not make the essence of a corresponding technical solution departing from the spirit and scope of the present disclosure.

The invention claimed is:

1. A liquid crystal display device comprising:
a color filter substrate including a first transparent substrate; and
an array substrate including a second transparent substrate,
wherein the first transparent substrate has a first transparent magnetic film layer formed thereon, the second transparent substrate has a second transparent magnetic film layer formed thereon, and the first transparent magnetic film layer and the second transparent magnetic film layer have the same magnetism to produce uniform magnetic fields of same polarities that repulse each other to form a cell gap between the color filter substrate and the array substrate,
wherein the color filter substrate further comprises:
a black matrix and color filters which are formed on the first transparent substrate; and
a common electrode formed on the black matrix and the color filters; and
wherein the first transparent magnetic film layer is formed between the common electrode and an alignment film.

2. The liquid crystal display device of claim 1, wherein the first transparent magnetic film layer and the second transparent magnetic film layer each include a dopant and a substance to be doped, the dopant is one or more of acetylacetonates comprising a magnetic transition group metal element, and the substance to be doped is one or more of acetylacetonates comprising a nonmagnetic transition group metal element.

3. The liquid crystal display device of claim 2, wherein the magnetic transition group metal element includes one or more of Fe, Co, Ni, and Mn, and the nonmagnetic transition group metal element includes one or more of Zn, Zr, Ti, and Ga.

4. The liquid crystal display device of claim 1, wherein the color filter substrate further comprises the alignment film formed on the outermost layer thereof.

5. The liquid crystal display device of claim 1, wherein the array substrate further comprises:
gates formed on the second transparent substrate;
a gate insulator layer formed on the gates;
an active layer, source/drain layers, and a pixel electrode layer which are formed on the gate insulator layer; and
an insulating layer formed on the source/drain layers and the pixel electrode layer.

6. The liquid crystal display device of claim 5, wherein the second transparent magnetic film layer is formed between the insulating layer and a second alignment film.

7. The liquid crystal display device of claim 6, wherein the array substrate further comprises the second alignment film formed on the outermost layer thereof.

8. A method for manufacturing a liquid crystal display device, comprising:
forming a color filter substrate including a first transparent substrate, the first transparent substrate having a first transparent magnetic film layer formed thereon;
forming an array substrate including a second transparent substrate, the second transparent substrate having a second transparent magnetic film layer formed thereon, and the second transparent magnetic film layer and the first transparent magnetic film layer having the same magnetism to produce uniform magnetic fields of same polarities that repulse each other to form a cell gap between the color filter substrate and the array substrate; and
bonding the color filter substrate to the array substrate to form a space between the color filter substrate and the array substrate, and injecting liquid crystals into the space; wherein the forming of the color filter substrate comprises:
forming a black matrix and color filters on the first transparent substrate;
forming a common electrode on the black matrix and the color filters; and
forming the first transparent magnetic film layer between the common electrode and an alignment film.

9. The method for manufacturing the liquid crystal display device of claim 8, wherein the forming of the array substrate comprises:
forming gates on the second transparent substrate;
forming a gate insulator layer on the gates;
forming an active layer, source/drain layers, and a pixel electrode layer on the gate insulator layer; and
forming an insulating layer on the source/drain layers and the pixel electrode layer.

10. The method for manufacturing the liquid crystal display device of claim 9, wherein the forming of the array substrate further comprises: forming the second transparent magnetic film layer between the insulating layer and a second alignment film.

11. The method for manufacturing the liquid crystal display device of claim 8, wherein the forming of the first transparent magnetic film layer or the second transparent magnetic film layer comprises:
mixing a dopant comprising a magnetic transition group metal element and a substance to be doped comprising a nonmagnetic transition group metal element into a mixed raw material, and pressing the mixed raw material into an evaporation target;
disposing the evaporation target in a container, disposing the container in a deposition chamber for a plasma enhanced chemical vapor disposition process, and vacuumizing the deposition chamber;
feeding the color filter substrate and the array substrate into the deposition chamber, making the insulating layer and the common electrode face directly just above the evaporation target, and feeding a reaction gas of $O_2$ into the deposition chamber and igniting it;
heating the container to make the mixed raw material in the evaporation target escape from a surface, and the molecules of $O_2$ decomposing, so that transparent films of the mixed raw material are deposited on the surfaces of the insulating layer and the common electrode through chemical reaction deposition;
stopping the heating and cooling the transparent films on the surfaces of the insulating layer and the common electrode spontaneously, and then drawing the color filer substrate and the array substrate out from the deposition chamber; and
locating the color filter substrate and the array substrate in a chamber in which an external magnetic field is applied, and performing a magnetization process on the transparent films to make them become transparent magnetic film layers.

12. The method for manufacturing the liquid crystal display device of claim 11, wherein the dopant is one or more of acetylacetonates comprising a magnetic transition group metal element, and the substance to be doped is one or more of acetylacetonates comprising a nonmagnetic transition group metal element.

13. The method for manufacturing the liquid crystal display device of claim 12, wherein the magnetic transition group metal element includes one or more of Fe, Co, Ni, and Mn, and the nonmagnetic transition group metal element includes one or more of Zn, Zr, Ti, and Ga.

14. The method for manufacturing the liquid crystal display device of claim 13, wherein the magnetic transition group metal element is Co, the atom ratio of Co in the mixed raw material is of 6%, the nonmagnetic transition group metal element is Ti, and the atom ratio of Ti in the mixed raw material is of 94%.

15. The method for manufacturing the liquid crystal display device of claim 8, wherein the forming of the color filter substrate includes: forming the alignment film on the outermost layer of the color filter substrate, and performing an alignment process on the alignment film; and the forming of the array substrate includes: forming a second alignment film on the outermost layer of the array substrate, and performing an alignment process on the second alignment film.

16. The method for manufacturing the liquid crystal display device of claim 8, further comprising after injecting the liquid crystals: sealing the color filter substrate and the array substrate using a photosensitive adhesive.

\* \* \* \* \*